Aug. 29, 1967 G. F. FELDBAUER, JR 3,338,030
DEPRESSURING TECHNIQUE FOR ΔP. ADSORPTION PROCESS
Filed July 1, 1964
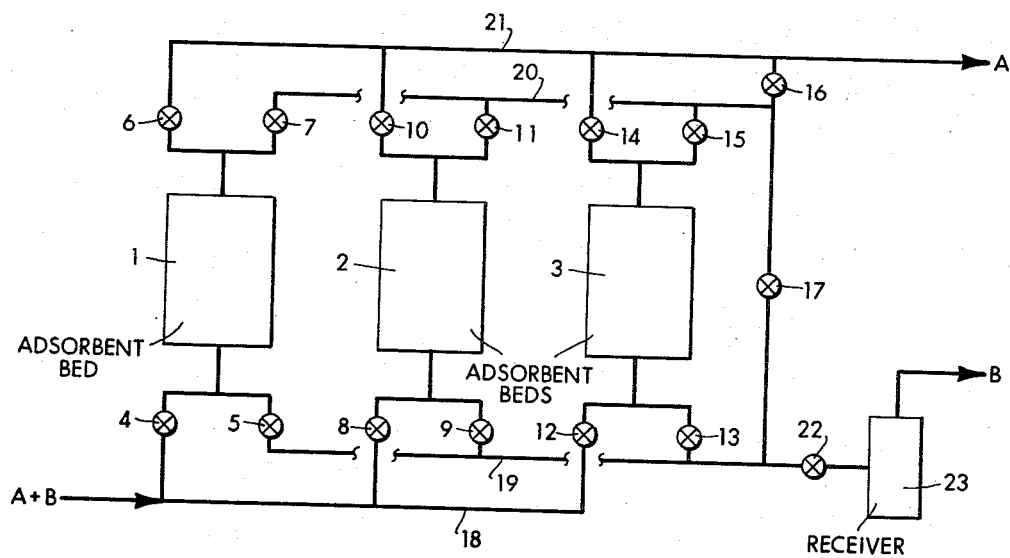
G. F. FELDBAUER, JR. INVENTOR
BY Robert L. Pearlman
PATENT ATTORNEY

United States Patent Office 3,338,030
Patented Aug. 29, 1967

3,338,030
DEPRESSURING TECHNIQUE FOR ΔP ADSORPTION PROCESS
George F. Feldbauer, Jr., Cranford, N.J., assignor to Esso Research and Engineering Company, a corporation of Delaware
Filed July 1, 1964, Ser. No. 380,988
12 Claims. (Cl. 55—25)

The present case is a continuation-in-part of Ser. No. 110,569, filed May 16, 1961, and now abandoned.

The instant invention relates to a new and improved adsorption process. More specifically, this invention relates to an improvement in cyclic adsorption processes utilizing a plurality of beds wherein the adsorbent in each bed is repeatedly saturated and desorbed of one or more components of a mixture. Even more specifically, the invention is directed to adsorption processes where desorption is effected by the reduction of pressure on one adsorbent bed by venting to a second bed at a lower pressure followed by depressuring the first bed to a lower pressure to complete the desorption. In particular preferred embodiments of the present invention, the first and second beds are joined through their product ends or even more preferably through their product and feed ends respectively to effectuate maximum overall process efficiency.

It is well-known in adsorption technology that an adsorbent, after saturation with one or more components, may be desorbed by reducing the partial pressure of that component in the atmosphere surrounding the adsorbent. The use of this principle may be seen in "heatless fractionation" as disclosed in Skarstrom's Patent U.S. 2,944,627, issued July 12, 1960. In addition, the use of a delta P cycle employing molecular sieve adsorbents is concisely disclosed in an article by Griesmer et al., Selective Adsorption, Petroleum Refiner, June 1960, vol. 39, No. 6, page 126.

In conventional delta P cycles, the pressure reduction at the beginning of the desorption step has been carried out in a variety of ways. For example, where the adsorption process is carried out for the purpose of obtaining a pure effluent, and where adsorption is conducted at superatmospheric pressure, the saturated absorbent may be merely vented to the atmosphere. If it is desired to retain the adsorbed material, again in a superatmospheric operation, the venting may be into a closed vessel, thereby permitting the recovery of the adsorbed material.

In other adsorption processes, whether adsorption is conducted at superatmospheric, subatmospheric or atmospheric pressure, more thorough desorption may be accomplished by use of a vacuum.

The use of the above-described desorption technique has advantages over thermal cycles. Since no heating and cooling are necessary, a fast cycle may be employed because no time is required for heating and cooling the bed. Also, the costs of heat requirements are eliminated.

Despite the overall effectiveness of the pressure cycle, it has been noted that the yield of the process is often too low for economical commercial operations, and that, furthermore, where it is desirable to have a desorbate of high purity, the desorbate is contaminated.

Observations have shown that these undesirable results are the result of entrapment of gas in the adsorption bed voids at the end of the adsorption step. This void gas is relatively rich in the less readily adsorbed components of the feed. Particularly when the adsorption is carried out at high pressure the amount of void gas is so large that the overall selectivity of the whole process is seriously impaired.

In accordance with the instant invention, it has been found that the selectivity of the pressure cycle can be greatly improved by reducing the pressure for desorption in two steps rather than one.

Briefly, in the first step, the adsorbent bed at high pressure and ready to be desorbed is connected to the bed which has just been desorbed at low pressure. Gas flows from the high pressure bed to the other until substantially equal pressures are reached in the two beds. This pressure will be somewhat below the average of the adsorption and desorption pressures. This results from the fact that adsorption takes place in the vessel being pressured. The quantity adsorbed exceeds the quantity desorbed from the bed being depressured. There is, therefore, less mols in the vapor phase after pressure equalization than the sum total in the two beds prior to the operation.

During this first step, some material is desorbed from the adsorbent in the high pressure bed. The desorbed material is higher in concentration of the nonadsorbed constituent, thereby decreasing the concentration of said constituent in the void gas remaining in the bed undergoing desorption. When the pressure in the two beds is about the same, the connection between them is broken. The bed being described is then vented to the atmosphere, or, if desirable to retain the desorbate, to a suitable low pressure unit. The other bed is then repressured for adsorption in a desired manner, for example, by introducing a sufficient amount of high pressure feed or nonadsorbed product.

This technique conserves the nonadsorbed product because (1) the volume of void gas vented is less than in one-step depressuring, and (2) the concentration of the nonadsorbed product in the vented gas is also less. These same considerations result in obtaining a vent gas which is of a higher purity of the adsorbed constituent.

In order to take full advantage of the benefits derivable by using the bed pressure equalization technique, it is necessary that the two beds be linked in a specific fashion. The desirable linkages include joining the product ends of the two beds or else joining the product end of the first bed with the feed end of the second bed during the pressure equalization step. With either of these techniques, adsorption effluent (containing very little of the more strongly adsorbed species) is transferred from the bed to be placed on desorption to the bed to be placed on adsorption. In this way, the concentration of the more strongly adsorbed species in the subsequent desorption effluent and the yield of adsorption effluent are increased.

Theoretically, product to feed is to be preferred over product to product. This is because the product transferred in the bed pressure equalization step is somewhat lower in purity than the composite adsorption effluent since breakthrough has progressed to some extent. If this is transferred to the product to the product end of a second bed, the purity of product obtained should be somewhat lower than if it is transferred to the feed end. However, in actual runs on the purification of hydrogen, no such advantage was found for the product to feed embodiment over the product to product embodiment. This may be due to the limited extent of breakthrough at the time of bed pressure equalization and the relative amounts of bed pressure equalization product and product separated in the adsorption step.

Linking up the two beds by means of feed end to feed end or feed end to product end techniques respectively is contraindicated by the comparative efficiencies in relation to the above-mentioned methods. In the feed end to feed end technique, the purity of the desorption effluent will be lowered since it is the material from the adsorbate rich end of the bed which is transferred. In addition, this type of transfer results in a lower adsorbent capacity since an adsorbate rich bed pressure equalization product is transferred to the desorbed bed.

If a feed to product end linkage is used, the same disadvantages apply, but in addition, the purity of the adsorption effluent is lowered since adsorbate rich bed pressure equalization product is transferred to the product end of the second bed.

To further illustrate the instant invention, attention is directed to the attached figure.

The figure shows a system of fixed adsorbent beds for the vapor phase separation of a mixture of A and B where A is the less readily adsorbed component or components. The beds are arranged to allow essentially continuous separation in a cyclical operation in which the roles of the beds are periodically changed. At any given time, one bed will be adsorbing at elevated pressure. A second bed, after adsorption, will be being depressured to or at the desorption pressure. A third bed, after desorption, will be being repressured to or will be at the elevated pressure for adsorption.

In the figure, bed 1 is on adsorption. The feed mixture flows from line 18 through valve 4 into the bed where B is predominantly adsorbed. Unadsorbed vapor is taken off through valve 6 and line 21 as product rich in A. Valves 5 and 7 are closed during this operation. The flow of feed through the bed will usually be continued until the concentration of B in the effluent begins to increase. However, in some cases it may be desirable to stop short of this point when the temperature of the effluent becomes higher than that of the feed. Heat of adsorption may be conserved in this manner as disclosed in U.S. 2,944,627.

Bed 2 is a bed which is to be desorbed and which contains vapor rich in A at the pressure used in adsorption. This bed is partially depressured by connecting it to bed 3 which has been desorbed and is initially at low pressure. In the product to feed preferred embodiment of joining the beds, vapor is allowed to flow from bed 2 through valve 11, line 20, valve 17, line 19 and valve 13 into bed 3. Valves 8, 9, 10, 12, 14, 15, 16 and 22 are closed during this step. The flow of vapor is usually allowed to continue until the same pressure is reached in both beds. This pressure will usually be less than the average of the initial pressures of the two beds because more material tends to be adsorbed in bed 3 during this operation than is desorbed in bed 2. In some situations, it may be desirable to stop the flow of vapor from bed 2 to bed 3 before equalization of pressure occurs.

Best results are obtained when the direction of flow out of bed 2 and into bed 3 is the same as that in the bed on adsorption. However, some improvement in process selectivity would be realized even if the directions were not the same.

For example, another preferred embodiment utilizes a product to product end linkage. In such a case vapor is allowed to flow from bed 2 through valve 11, line 20, valve 15 into bed 3. Valves 8, 9, 10, 12, 13, 14, 16 and 22 are closed during this step.

After the desired flow from bed 2 to bed 3 is accomplished, the connection between the two beds is closed. Bed 2 is further depressured by allowing vapor to flow through valve 9, line 19, and valve 22 into receiver 23 maintained at the desired final desorption pressure and in which a product rich in B is collected. Valves 8, 10, 11 and 17 are closed during this depressuring. In some cases, it may be advantageous to effect further desorption after depressuring by purging the bed. An effective technique is to backwash with some of the nonadsorbed product. This may be taken from line 21 and introduced into bed 2 through valve 16, line 20, and valve 11. An extraneous gas free of component B may also be used.

Bed 3 is brought to adsorption pressure by the introduction of either feed or nonadsorbed product. Feed is taken from line 18 and fed through valve 12 with valves 13, 14 and 15 closed. Product A is taken from line 21 and fed through valve 14 with valves 12, 13 and 15 closed.

At the end of an operating cycle as described above, the bed which had been adsorbing is depressured and desorbed, the bed which had been desorbed is repressured and the bed which had been repressured is placed on adsorption.

Any of numerous adsorbents may be utilized, depending on the particular separation desirable. The following table illustrates examples of separations and adsorbents which may be employed:

TABLE I

| Separation | Adsorbent |
|---|---|
| $H_2$ from refinery gases | Char, sieve, alumina or combinations. |
| $H_2$ from natural gases | Do. |
| $H_2S$ from refinery gases | Sieves. |
| $H_2S$ from natural gases | Do. |
| Hydrocarbon recovery from natural gas ($C_2+$ from $C_1$). | Char, alumina, silica, fuller's earth, bauxite. |
| $H_2O$ from air | Do. |
| $H_2O$ from refinery gases such as power-former recycle gas. | Alumina, silica, sieves. |
| $O_2$ from $N_2$ | Sieves. |
| Argon from air | Do. |
| Carbon oxides from flue gases | Do. |
| N paraffins from other hydrocarbons | 5A. sieve. |
| Benzene from light naphthas | Char, alumina, 10X and 13X sieves. |

The operating conditions employed vary with the type of separation, the type of adsorbent employed, and the product purity required. The following table illustrates typical operating conditions for particular separations. The feed material is maintained in the gaseous phase.

TABLE II

| Application | °F. | Pressure, p.s.i.a. | |
|---|---|---|---|
| | | Adsorption | Desorption |
| $H_2$ from refinery gas | 0–300 | 50–1,000 | 1–50 |
| Hydrocarbon recovery from natural gas | 0–300 | 50–1,000 | 1–50 |
| $H_2O$ from gases | 50–400 | 15–1,000 | 1–50 |
| N paraffins from isomers | 300–600 | 50–200 | 1–50 |

In performing the desorption in accordance with the instant invention, it is generally desirable that the pressure be reduced in two steps. When a two-step desorption is used, the pressure should be reduced from about 25 to 75% in the first step, preferably about 50%, and, of course, the remaining depressurization in the final step.

In addition, while it is noted that it is preferred to use three beds for adsorption as illustrated in the above figure, more or less beds may be employed. For example, if continuous operation is not necessary, the process of the instant invention can be readily carried out by utilizing only two beds.

In some situations, it may be desirable to depressure in more than two steps and to use the vapor involved in all but the final step for repressuring. For example, where a three-step depressuring is desired, continuous operation may be obtained by using four adsorption zones. The technique may also be applied in a moving bed and fluidized bed system.

The following example more emphatically illustrates the advantages of the instant invention.

*Example*

The following table shows a rough comparison of two-step vs. one-step depressuring in an isothermal delta P process for separating hydrogen and methane using a 5A molecular sieve. In both cases adsorption pressure is 500 p.s.i.a. and desorption pressure is 20 p.s.i.a. The amount of hydrogen lost in the two-step operation is 6% of the hydrogen in the feed or less than ⅓ that which is lost in the conventional one-step case.

TABLE III

|  | Two-Step | One-Step |
|---|---|---|
| Hydrogen Concentration, Percent: | | |
| In Feed | 40 | 40 |
| In Product | 96 | 96 |
| In Void Gas Vented | 18 | 40 |
| Hydrogen Recovery, Percent | 94 | 80 |
| Sieve Capacity, s.c.f., $C_1$/lb | 38 | 48 |

In certain applications of the instant invention, it may be desirable to subject the adsorption beds to a periodic high temperature regeneration. For example, in treating powerformer off-gas to recover hydrogen, the heavy components of the gases ($C_8+$) have a fouling effect and cause the activity of the adsorbent to fall off. The original activity may be restored by subjecting the adsorbent to temperatures from about 500 to 1000° F., preferably 700° F., for periods of about 15 minutes to 2 hours. The heating may readily be accomplished by recycling a hot inert gas, such as nitrogen, over the bed. Before the bed is put on stream, it is allowed to cool to the preferred adsorption temperature. Where continuous operation is desirable, an additional bed is employed so that when one bed is undergoing regeneration there is a sufficient number of activated beds remaining for the hitherto described adsorption and desorption.

The above example and description are merely exemplary of the instant invention and are not intended to define its scope.

What is claimed is:

1. An improved adsorption process which comprises: introducing a feed containing more readily adsorbable components and less readily adsorbable components into a first end of a first adsorption zone at a relatively high adsorption pressure; selectively adsorbing said more readily adsorbable components; withdrawing a stream from a second end of said first adsorption zone, said stream containing essentially the less readily adsorbable components; depressurizing, after withdrawing said stream, and thereby partially desorbing said first adsorption zone by first connecting the said second end of said first adsorption zone to a second adsorption zone which second adsorption zone is at a relatively reduced pressure; disconnecting said adsorption zones when they are at substantially equal pressure, said last named pressure being intermediate to said relatively high and relatively low pressures; completing desorption of first adsorption zone by further reducing the total pressure to said relatively low pressure.

2. The process of claim 1 wherein the said intermediate pressure is from about 25 to 75% of the difference between said relatively high and said relatively low pressure.

3. The process of claim 1 wherein said intermediate pressure is about one-half the difference of said relatively high and said relatively low pressure.

4. A process according to claim 1 wherein the pressure in said second adsorption zone is raised from said intermediate pressure to a relatively high pressure by introducing feed into said second adsorption zone.

5. A process according to claim 1 wherein said second adsorption zone is raised in pressure from an intermediate pressure to a relatively high pressure by introducing product into said second adsorption zone.

6. A process according to claim 1 wherein said second adsorption zone is connected to said first adsorption zone through the product withdrawal end of said second adsorption zone.

7. A method according to claim 1 wherein said second adsorption zone is connected to said first adsorption zone through the feed end of said second adsorption zone.

8. An improved adsorption process which comprises: (1) introducing a feed containing a more readily adsorbable component and a less readily adsorbable component into a first end of a first adsorption zone at a relatively high pressure; (2) selectively adsorbing said more readily adsorbable component; (3) withdrawing a stream enriched in said less readily adsorbable component from a second end of said first adsorption zone; (4) discontinuing the introduction of feed to said first adsorption zone; (5) introducing said feed into a second adsorption zone; (6) after discontinuing the introduction of feed in said first zone, openly connecting said second end of said first adsorption zone to a third adsorption zone at a relatively low pressure, thereby initially desorbing at least a portion of said adsorbed material in said first adsorption zone; (7) permitting said first and third adsorption zones to come to substantially equal pressure, said last named pressure being intermediate to said relatively high and said relatively low pressures; (8) disconnecting said first and third adsorption zones; (9) reducing the pressure in said first adsorption zone to said relatively low pressure, thereby desorbing at least another portion of said adsorbed material; (10) discontinuing the introduction of said feed to said second adsorption zone; (11) introducing said feed into said third adsorption zone; and (12) continuing said process.

9. The process of claim 8 wherein the process is substantially isothermal.

10. The process of claim 8 wherein the feed is a refinery gas and the less readily adsorbable component is hydrogen.

11. The process of claim 10 wherein said adsorption zone contains at least one of the materials selected from the group consisting of char, alumina, and molecular sieves.

12. The process of claim 1 wherein a portion of said stream containing the less readily adsorbable components withdrawn from the adsorption zone is employed as purge gas for desorbing said second adsorption zone while it is on the desorption cycle.

References Cited

UNITED STATES PATENTS

| 3,085,379 | 4/1963 | Kiyonage et al. | 55—58 |
| 3,086,339 | 4/1963 | Skarstrom et al. | 55—26 |
| 3,104,162 | 9/1963 | Skarstrom | 55—58 |

REUBEN FRIEDMAN, *Primary Examiner.*

C. HART, *Assistant Examiner.*